(12) United States Patent
Iwamoto

(10) Patent No.: US 9,046,970 B2
(45) Date of Patent: Jun. 2, 2015

(54) POINTER DETECTION APPARATUS, POSITION DETECTION SENSOR, AND MANUFACTURING METHOD FOR POSITION DETECTION SENSOR

(75) Inventor: Naohisa Iwamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 897 days.

(21) Appl. No.: 13/189,144

(22) Filed: Jul. 22, 2011

(65) Prior Publication Data

US 2012/0044200 A1 Feb. 23, 2012

(30) Foreign Application Priority Data

Aug. 20, 2010 (JP) .................................. 2010-184668

(51) Int. Cl.
*G06F 3/044* (2006.01)
(52) U.S. Cl.
CPC ........... *G06F 3/044* (2013.01); *Y10T 29/49117* (2015.01); *G06F 2203/04111* (2013.01)
(58) Field of Classification Search
None
See application file for complete search history.

(56) References Cited

U.S. PATENT DOCUMENTS

| 8,502,802 | B2 | 8/2013 | Teramoto | |
|---|---|---|---|---|
| 2007/0165006 | A1* | 7/2007 | Sato et al. | ....................... 345/174 |
| 2009/0166100 | A1 | 7/2009 | Matsubara | |
| 2009/0244028 | A1 | 10/2009 | Matsuo | |
| 2010/0026661 | A1 | 2/2010 | Teramoto | |
| 2010/0045613 | A1* | 2/2010 | Wu et al. | ....................... 345/173 |
| 2010/0182275 | A1* | 7/2010 | Saitou | ........................... 345/174 |
| 2011/0291961 | A1* | 12/2011 | Hsieh et al. | ................... 345/173 |
| 2013/0306460 | A1 | 11/2013 | Teramoto | |

FOREIGN PATENT DOCUMENTS

| JP | 2008009921 A | 1/2008 |
|---|---|---|
| JP | 2009162538 A | 7/2009 |
| JP | 2009259203 A | 11/2009 |
| JP | 2010033478 A | 2/2010 |

OTHER PUBLICATIONS

Japanese Office Action dated May 27, 2014, for corresponding JP Application No. 2010-184668, 2 pages.

* cited by examiner

*Primary Examiner* — William Boddie
*Assistant Examiner* — Bipin Gyawali
(74) *Attorney, Agent, or Firm* — Seed IP Law Group PLLC

(57) ABSTRACT

A pointer detection apparatus and a position detection sensor are provided, with which a signal transmission characteristic of a conductor for detecting a position at a periphery of a transparent region (valid area) is improved. Also, a simplified method of manufacturing the position detection sensor is provided. The position detection sensor includes a first glass substrate, a transmission conductor group formed of a plurality of transparent conductors disposed on one face of the first glass substrate, a reception conductor group formed of a plurality of transparent conductors disposed in a direction crossing the transmission conductor group, and a signal detection circuit for detecting a signal generated in the reception conductor group based on the existence of a pointer near the position detection sensor. The position detection sensor further includes a metal wiring line pattern disposed in parallel with the transmission conductor group in a non-transparent region (outside the valid area) so as to reduce resistance of that portion of the transmission conductor group to thereby improve its signal transmission characteristic.

20 Claims, 9 Drawing Sheets

POINTER DETECTION APPARATUS, POSITION DETECTION SENSOR, AND MANUFACTURING METHOD FOR POSITION DETECTION SENSOR

CROSS-REFERENCE TO RELATED APPLICATION

The present application claims priority under 35 U.S.C. 119(a) of Japanese Application No. 2010-184668, filed Aug. 20, 2010, the entire content of which is incorporated herein by reference.

TECHNICAL FIELD

The present invention relates to a pointer detection apparatus and a position detection sensor, which is mounted on a surface of a display screen for carrying out position detection of a pointer, and a manufacturing method for the position detection sensor.

BACKGROUND ART

A capacitance type inputting apparatus is known, which is disposed on the surface of a display screen of a liquid crystal display apparatus and detects a position touched by a finger of a user or the like to thereby carry out inputting of information corresponding to a displayed pointing image (see, for example, Patent Document 1). In this capacitance type inputting apparatus, transparent electrode patterns which cross each other are formed on the surface of a transparent substrate, and the position of a finger of a user is detected based on a variation of the capacitance which occurs when the finger touches the surface of the transparent electrode patterns.

PRIOR ART DOCUMENT

Patent Document

[Patent Document 1]
Japanese Patent Laid-Open No. 2009-259203 (pp. 5-15, FIGS. 1-11)

SUMMARY OF THE INVENTION

Problem to be Solved by the Invention

In the capacitance type inputting apparatus disclosed in Patent Document 1 described above, to allow position detection at an end (or edge) portion of a display region of the display screen in a similar manner to that in other portions, it is necessary to form transparent electrode patterns in a region greater than the display region. For example, in the case where the center position of a region that a finger contacts is located in an end portion of the display region (i.e., a transparent region), to detect the center position accurately, it is necessary to detect the entire region that the finger contacts, and to this end, the transparent electrode patterns need to be extended to non-transparent regions adjacent to the transparent region.

When the transparent electrode patterns are extended to the non-transparent regions in this manner, since the transparent electrode patterns having higher resistance in comparison with metals become long, a problem arises that the transmission characteristic of a signal through the electrode patterns is degraded. Particularly with an ITO (Indium Tin Oxide) film which is widely used to form transparent electrode patterns, since it is high in resistance value in comparison with metals such as aluminum or molybdenum, degradation of the signal transmission characteristic becomes apparent.

The present invention has been made in view of such problem described above and, according to one aspect, the invention provides a pointer detection apparatus and a position detection sensor, with which a signal transmission characteristic of a conductor for detecting a pointer position in a transparent region including an end portion thereof is improved. The invention further provides a manufacturing method for such position detection sensor.

Means for Solving the Problem

In order to solve the problem described above, a pointer detection apparatus according to one embodiment of the present invention is a pointer detection apparatus which has a display apparatus including a display region for displaying information and a position detection sensor, which is disposed in an opposing relationship to the display region of the display apparatus, for detecting a position pointed to by a pointer. The position detection sensor includes a substrate having a transparent property at a region thereof which corresponds to the display region. The position detection sensor also includes a plurality of conductors disposed in a first direction and another plurality of conductors disposed in a second direction that crosses the first direction on one face side of the substrate. At each of the positions where the plurality of conductors disposed in the first direction cross the plurality of conductors disposed in the second direction, a first conductive member having a resistance value lower than that of the plurality of conductors is provided for connecting (or bridging) a pair of conductor pieces, which are disposed in the first direction and are adjacent to each other with a gap therebetween to form one of the plurality of conductors disposed in the first direction, while assuring insulation from the plurality of conductors disposed in the second direction. In a region other than the region of the position detection sensor which corresponds to the display region of the display apparatus, a second conductive member made of the same material as the first conductive member is disposed at one end portion of one of the plurality of conductors, to which transmission signals are supplied.

Since the second conductive member is disposed at one end portion of the conductor, to which a transmission signal is supplied, in a region beyond (other than) the region corresponding to the display region, the resistance at this end portion of the transmission conductor is reduced and, accordingly, the overall resistance of the entire transmission conductor including this end portion is also reduced. Consequently, the transmission characteristic of a signal through the transmission conductor is improved.

According to one aspect of the invention, the second conductive member is disposed at one end portion of one of the plurality of conductors to which a transmission signal is inputted. Additionally or alternatively, the second conductive member may also be disposed at one end portion of one of the plurality of conductors from which a position detection signal is extracted (i.e., a reception conductor), to improve the signal transmission characteristic of the reception conductor.

According to a further aspect of the invention, the second conductive member is disposed in an overlapping relationship with one of the plurality of conductors. This allows for easy electric connection between the second conductive member and the conductor without requiring additional special processing.

According to yet another aspect of the invention, the second conductive member is formed integrally with the first conductive member. This allows for formation of the second conductive member at an end portion of a conductor by merely extending the first conductive member, which connects a pair of conductor pieces that form the conductor, to thereby simplify the manufacturing process.

According to a further aspect of the invention, a position detection sensor is provided to be disposed in an opposing relationship to a display region of a display apparatus. The position detection sensor is configured to detect a position pointed to by a pointer. The sensor includes a substrate having a transparent property at least at a predetermined region thereof configured to oppose and overlap the display region of the display apparatus. The sensor also includes a plurality of conductors disposed in a first direction on one face side of the substrate and another plurality of conductors disposed in a second direction that crosses the first direction. Each of the plurality of conductors disposed in the first direction is formed from a plurality of conductor pieces separated from each other by gaps at positions where the plurality of conductors disposed in the first direction cross the plurality of conductors disposed in the second direction, and a first conductive member that connects a pair of the adjacent conductor pieces while ensuring insulation from one of the plurality of conductors disposed in the second direction. In a region of the substrate other than the predetermined region, a second conductive member made of the same low-resistance material as that of said first conductive member is disposed on one end portion of one of the plurality of conductors disposed in the first direction or in the second direction.

Since the second conductive member made of low-resistance material is disposed at one end portion of one of the conductors, in a region beyond (other than) the predetermined region corresponding to the display region, the resistance at this end portion of the conductor is reduced and, accordingly, the overall resistance of the entire conductor including this end portion is also reduced. Consequently, the transmission characteristic of a signal through the conductor is improved.

According to another aspect of the invention, a method is provided for manufacturing a position detection sensor for use in a pointer detection apparatus. The method includes generally the following four steps. First, a conductor film having a transparent property is disposed on one face side of a substrate having a transparent property at least at a predetermined region thereof. Second, a plurality of conductors disposed in a first direction and another plurality of conductors disposed in a second direction crossing the first direction are formed from the conductor film, and also, at each of positions where the plurality of conductors disposed in the first direction cross the plurality of conductors disposed in the second direction (i.e., at the cross points), one of the conductors disposed in one of the directions is formed into a plurality of conductor pieces that are electrically separated from one of the conductors disposed in the other direction. Third, an insulator is formed at the cross points. Fourth, at each of the cross points, a first conductive member that connects a pair of conductor pieces is disposed in an overlapping relationship with the insulator, and also, a second conductive member made of the same material as that of the first conductive member is disposed at one end portion of one of the plurality of conductors disposed in said one of the directions.

In the position detection sensor manufactured according to the method described above, since the second conductive member made of the same material as the first conductive member is disposed at one end portion of one of the conductors, the resistance at this end portion of the conductor is reduced, and the overall resistance of the entire conductor including this end portion is reduced, to thereby improve the transmission characteristic of a signal through the conductor. Further, since the second conductive member disposed at an end portion of a conductor may be formed by merely extending the first conductive member, which connects a pair of conductor pieces that form the conductor, the manufacturing process is simplified.

DETAILED DESCRIPTION

In the following, a pointer detection apparatus of an embodiment, to which the present invention is applied, is described with reference to the drawings.

Figure 1:
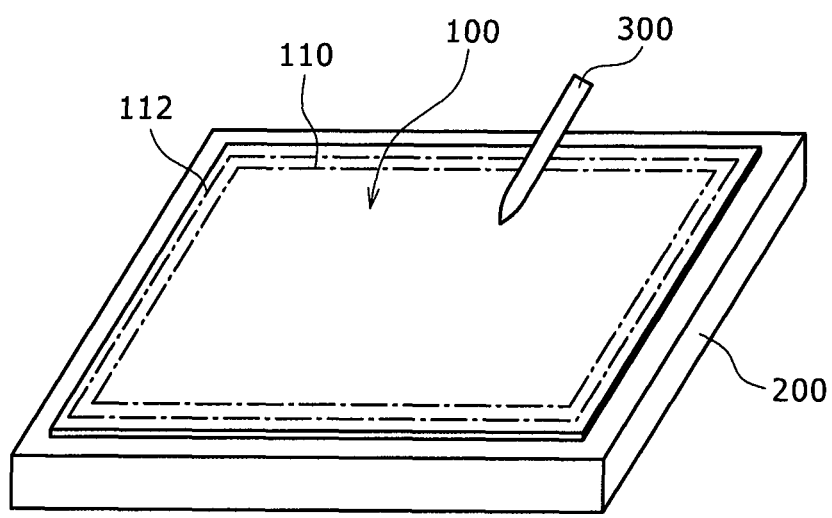
FIG. 1 is a schematic perspective view of a pointer detection apparatus of an embodiment.

FIG. 1 is a schematic perspective view of a pointer detection apparatus of an embodiment. The pointer detection apparatus of the present embodiment includes a display apparatus 200, such as an LCD (Liquid Crystal Display) unit or the like, which includes a display region for displaying information, and a position detection sensor 100 disposed in an opposing relationship to the display face of the display apparatus 200 for detecting a position pointed to by a pointer 300, which may be a finger of a user or the like. It is to be noted that the "pointer" may be a pen including a conductor at a tip end thereof so as to absorb an electrostatic field along a path through the human body to the ground to detect a position according to the same principle as that used in finger detection, and may also be a pen which itself transmits a signal.

Referring to FIG. 1, the position detection sensor 100 has a transparent region 110 through which the display region of the display apparatus 200 disposed in an overlapping relationship therewith can be observed. A detection region 112 is set so as to have an area greater than the transparent region 110 by a predetermined width along each side. The detection region 112 is a region in which a position pointed to by the pointer 300 can be detected.

Figure 2:
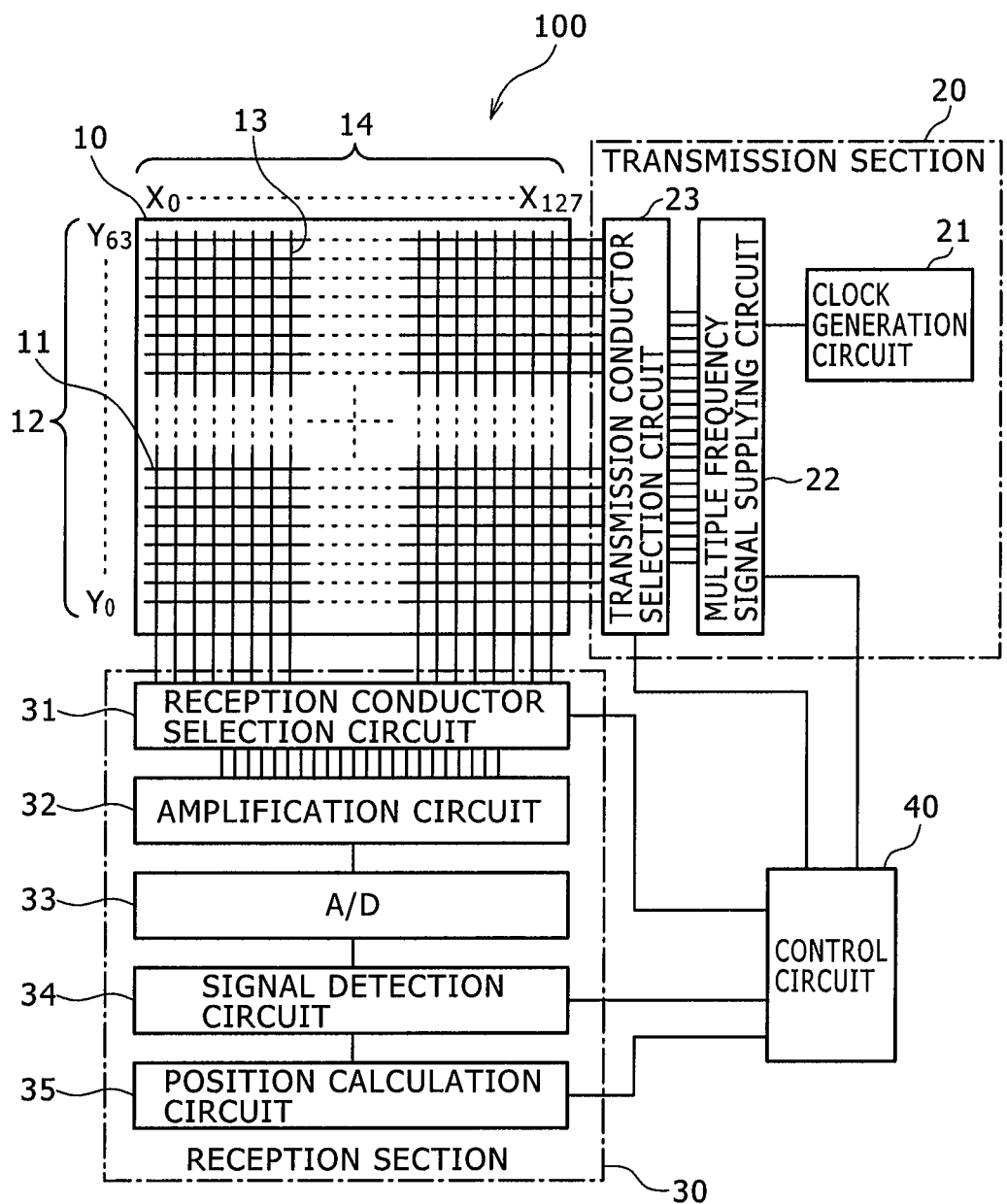
FIG. 2 is a view showing a general configuration of a position detection sensor.

FIG. 2 is a view showing a general configuration of the position detection sensor 100. As shown in FIG. 2, the position detection sensor 100 includes a sensor section 10, a transmission section 20, a reception section 30, and a control circuit 40. The sensor section 10 includes conductor patterns, including a transmission conductor group 12 (the first conductor pattern) formed of transmission conductors 11, which are a plurality of transparent conductors disposed at an equal interval in a predetermined direction (the first direction), and a reception conductor group 14 (the second conductor pattern) formed of reception conductors 13, which are a plurality of transparent conductors disposed at an equal interval in a direction (the second direction) perpendicular to the first direction of the plurality of transmission conductors 11.

Figure 3:
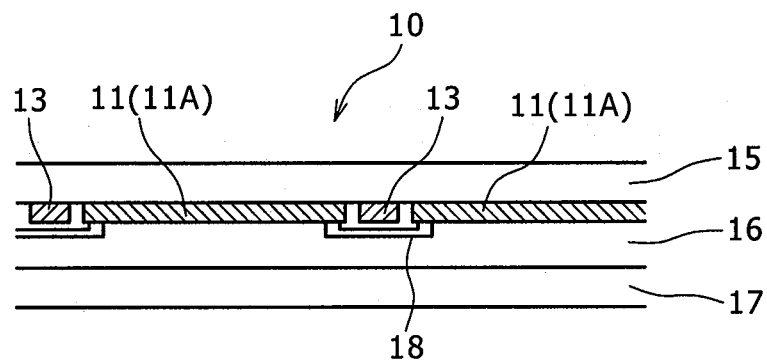
FIG. 3 is a sectional view of a sensor section.

FIG. 3 is a sectional view of the sensor section 10 and shows a partial transverse section taken along one transmission conductor 11. In the sensor section 10, both the transmission conductors 11 and the reception conductors 13 are formed on a surface of a first glass substrate 15, which is a transparent substrate, and a second glass substrate 17, which is also a transparent substrate, is disposed over the surfaces of the transmission conductors 11 and the reception conductors 13 with a spacer 16 interposed therebetween. As shown in FIG. 3, each transmission conductor 11 is divided along a longitudinal direction (i.e., in an extending direction) into a plurality of conductor pieces 11A with gaps formed at positions where the reception conductors 13 are arranged. A metal jumper line 18 is formed in such a manner as to cross over each reception conductor 13, and two adjacent conductor pieces 11A are electrically connected to each other by the metal jumper line 18. In the present embodiment, the metal jumper line 18 corresponds to a first conductive member having a resistance value lower than that of the transmission conductors 11 or the reception conductors 13.

Each of the transmission conductors 11 and the reception conductors 13 has a shape of a flat plate and is formed from a transparent electrode film formed, for example, of an ITO film. In the present embodiment, for example, 64 transmission conductors 11 are juxtaposed in the vertical direction (Y direction) at a predetermined interval. Meanwhile, 128 reception conductors 13 are juxtaposed in the horizontal direction (X direction) at a predetermined interval. Referring to FIG. 2, $Y_0$ to $Y_{63}$ correspond respectively to the 64 transmission conductors 11, and the transmission conductors 11 are juxtaposed in the order of $Y_0$ to $Y_{63}$. Further, $X_0$ to $X_{127}$ respectively correspond to 128 reception conductors 13, and the reception conductors 13 are juxtaposed in the order of $X_0$ to $X_{127}$.

The spacer 16 is an insulator and is formed from, for example, an OCA (Optical Clear Adhesive, highly transparent adhesive transfer tape), PVB (PolyVinyl Butyral), EVA (Ethylene Vinyl Acetate), silicon rubber or the like. The first and second glass substrates 15 and 17 may be formed from a sheet-like (film-like) material made of a synthetic resin or the like.

The transmission section 20 shown in FIG. 2 includes a clock generation circuit 21, a multiple frequency signal supplying circuit 22, and a transmission conductor selection circuit 23. The clock generation circuit 21 generates a reference signal of a predetermined frequency. The multiple frequency signal supplying circuit 22 uses the reference signal outputted from the clock generation circuit 21 to generate, for example, 16 signals of different frequencies $f_0, f_1, \ldots, f_{15}$ and outputs the signals in parallel. It is to be noted that, while in FIG. 2 the transmission conductor selection circuit 23 is connected to the right end of the transmission conductors 11, in this embodiment actually both of the right end and the left end of the transmission conductors 11 are connected to the transmission conductor selection circuit 23 such that a signal is inputted to each transmission conductor 11 from both end portions thereof.

Figure 4:
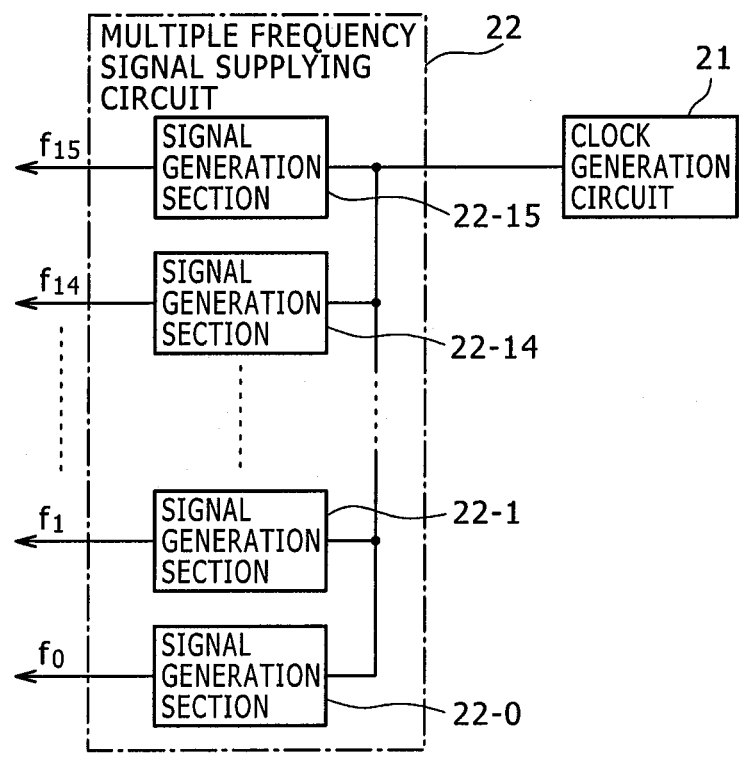
FIG. 4 is a view showing a detailed configuration of a multiple frequency signal supplying circuit.

FIG. 4 is a view showing a detailed configuration of the multiple frequency signal supplying circuit 22. The multiple frequency signal supplying circuit 22 includes 16 signal generation sections 22-0, 22-1, . . . , 22-15 for generating signals of the 16 different frequencies $f_0, f_1, \ldots, f_{15}$ separately from each other. The signal generation sections 22-0 to 22-15 generate signals of the frequencies $f_0$ to $f_{15}$ based on the reference signal outputted from the clock generation circuit 21. For example, the signal generation sections 22-0 to 22-15 divide or multiply the reference signal outputted from the clock generation circuit 21 to generate signals of the predetermined frequencies. Alternatively, the signal generation sections 22-0 to 22-15 have waveform data ROMs, which retain waveform data of sine waves whose periods are different from each other, and read out the waveform data in synchronism with the reference signal outputted from the clock generation circuit 21 to generate sine wave signals of the frequencies $f_0$ to $f_{15}$.

The transmission conductor selection circuit 23 selects those transmission conductors 11, which are supply destinations of 16 signals outputted in parallel from the multiple frequency signal supplying circuit 22, and selectively switches the transmission conductors 11 in order.

Figure 5:
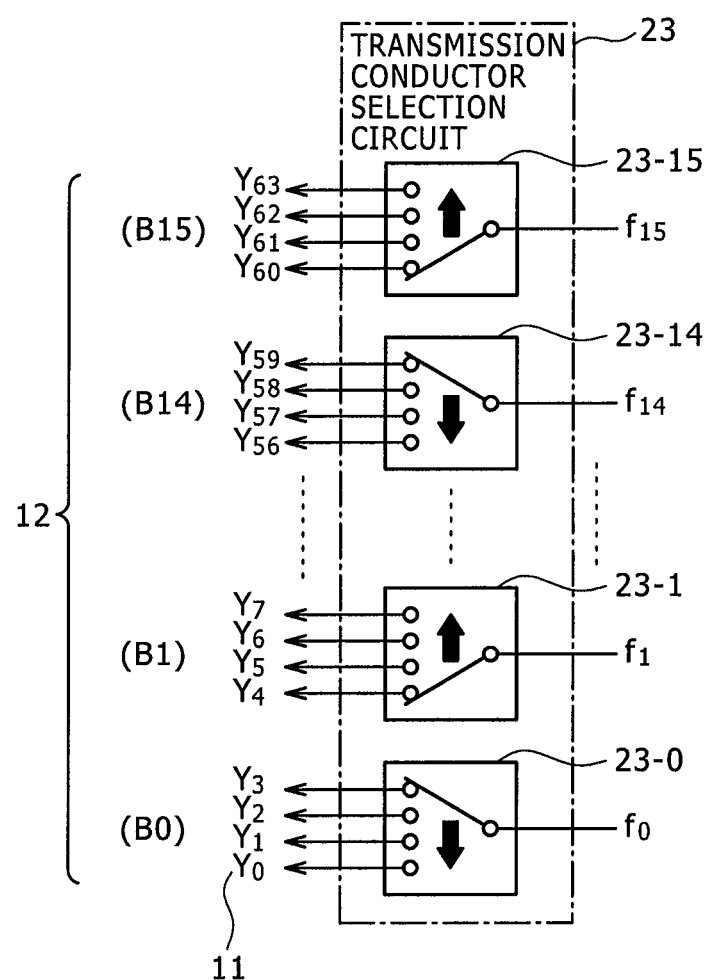
FIG. 5 is a view showing a detailed configuration of a transmission conductor selection circuit.

FIG. 5 is a view showing a detailed configuration of the transmission conductor selection circuit 23. The transmission conductor selection circuit 23 includes 16 switches 23-0, 23-1, . . . , 23-15, to which the signals of the 16 different frequencies $f_0, f_1, \ldots, f_{15}$ are inputted separately from each other. In the present embodiment, the 64 transmission conductors 11 are divided and grouped (classified) into 16 blocks B0 to B15.

The block B0 includes four transmission conductors 11 denoted by $Y_0$ to $Y_3$ and disposed adjacent to each other. The switch 23-0 successively selects a transmission conductor 11, which is to be a supply destination of a signal of the frequency $f_0$ outputted from the signal generation section 22-0, in the order of $Y_3, Y_2, Y_1$ and $Y_0$ repetitively at a predetermined interval of time. It is to be noted that, in FIG. 5, the switching direction of the transmission conductors 11 is indicated by an arrow mark shown in the switches 23-0 to 23-15.

The block B1 includes four transmission conductors 11 denoted by $Y_4$ to $Y_7$ and disposed adjacent to each other. The switch 23-1 successively selects a transmission conductor 11, which is to be a supply destination of a signal of the frequency $f_1$ outputted from the signal generation section 22-1, in the order of $Y_4, Y_5, Y_6$ and $Y_7$ repetitively at a predetermined interval of time.

The foregoing applies similarly to the other blocks B2 to B15 and switches 23-2 to 23-5, and each of the switches 23-2 to 23-15 successively selects a transmission conductor 11, which is to be a supply destination of a signal of a corresponding one of the signal generation sections 22-2 to 22-15, in a predetermined order and at a predetermined interval of time.

The reception section 30 shown in FIG. 2 includes a reception conductor selection circuit 31, an amplification circuit 32, an analog-digital conversion circuit (A/D) 33, a signal detection circuit 34, and a position calculation circuit 35.

Figure 6:
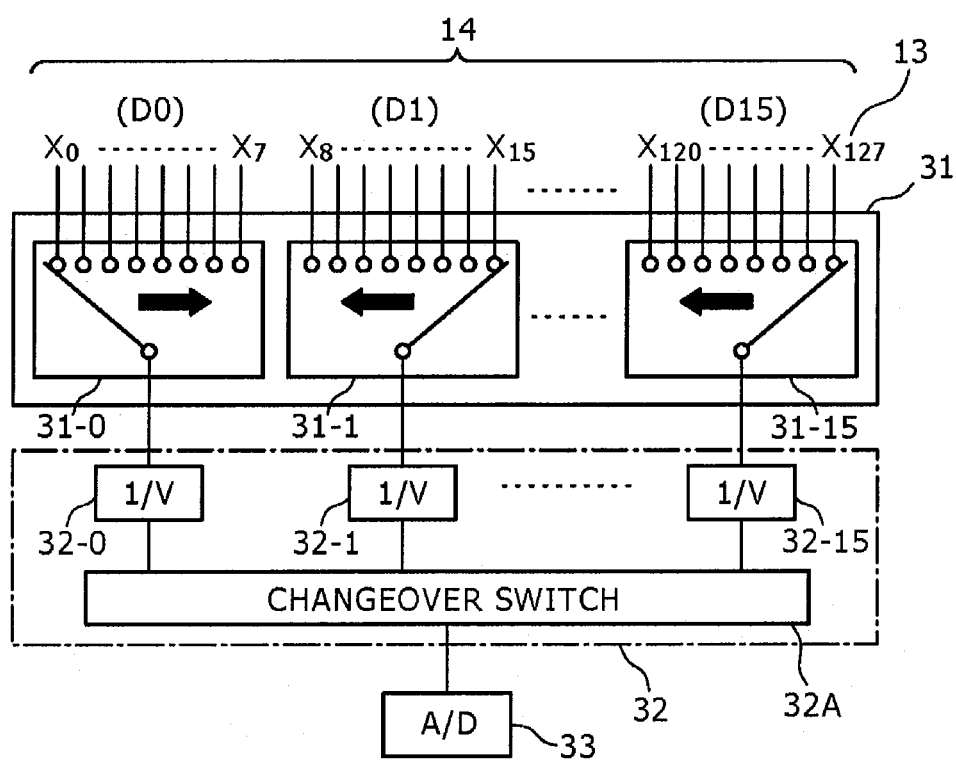
FIG. 6 is a view showing a detailed configuration of a reception conductor selection circuit and an amplification circuit.

FIG. 6 is a view showing a detailed configuration of the reception conductor selection circuit 31 and the amplification circuit 32. The reception conductor selection circuit 31 includes 16 switches 31-0, 31-1, . . . , 31-15, each for successively selecting the corresponding eight reception conductors 13. In the present embodiment, the 128 reception conductors 13 are divided and grouped (classified) into 16 blocks D0 to D15. Further, in the present illustration, one of two adjacent blocks corresponds to a first conductor group while the other corresponds to a second conductor group.

The block D0 includes eight reception conductors 13 denoted by $X_0$ to $X_7$ and disposed adjacent to each other. The switch 31-0 selects one of the eight reception conductors 13 and successively switches the selection state at a predetermined interval of time in the order of $X_0$, $X_1$, $X_2$, $X_3$, $X_4$, $X_5$, $X_6$ and $X_7$. It is to be noted that, in FIG. 6, the switching direction of the reception conductors 13 is indicated by an arrow mark shown in the switches 31-0 to 31-15.

The block D1 includes eight reception conductors 13 denoted by $X_8$ to $X_{15}$ and disposed adjacent to each other. The switch 31-1 selects one of the eight reception conductors 13 and successively switches the selection state at a predetermined interval of time in the order of $X_{15}$, $X_{14}$, $X_{13}$, $X_{12}$, $X_{11}$, $X_{10}$, $X_9$ and $X_8$.

The foregoing applies similarly to the other blocks D2 to D15 and switches 31-2 to 31-15, and each of the switches 31-2 to 31-15 selects one of the eight reception conductors 13 included in a corresponding one of the blocks D2 to D15 and disposed adjacent to each other, and successively switches the selection state in a predetermined order and at a predetermined interval of time.

The amplification circuit 32 includes 16 current-voltage conversion circuits (I/V) 32-0, 32-1, . . . , 32-15, and a changeover switch 32A. The current-voltage conversion circuits 32-0 to 32-15 correspond in a one-by-one corresponding relationship to the switches 31-0 to 31-15, respectively. Each of the current-voltage conversion circuits 32-0 to 32-15 amplifies current I outputted from a reception conductor 13 selected by the corresponding switch 31-0 or the like with a predetermined gain and converts the current I into a voltage V. The changeover switch 32A selects signals (voltages) outputted from the 16 current-voltage conversion circuits 32-0 to 32-15 in order and inputs the selected signal (voltage) to the analog-digital conversion circuit 33.

The analog-digital conversion circuit 33 converts an output voltage from each of the 16 current-voltage conversion circuits 32-0 to 32-15, which is successively selected by the changeover switch 32A, into data having a predetermined number of bits.

The signal detection circuit 34 shown in FIG. 2 detects, based on data outputted from the analog-digital conversion circuit 33, the signal level of each of the 16 different frequencies $f_0$, $f_1$, . . . , $f_{15}$ components outputted from the multiple frequency signal supplying circuit 22.

Figure 7A:
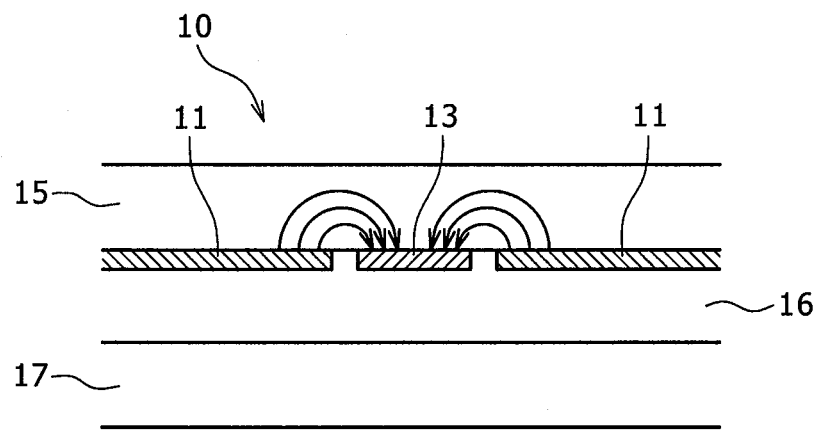
FIGS. 7A and 7B are explanatory diagrams showing a signal level detected by a signal detection circuit.
Figure 7B:
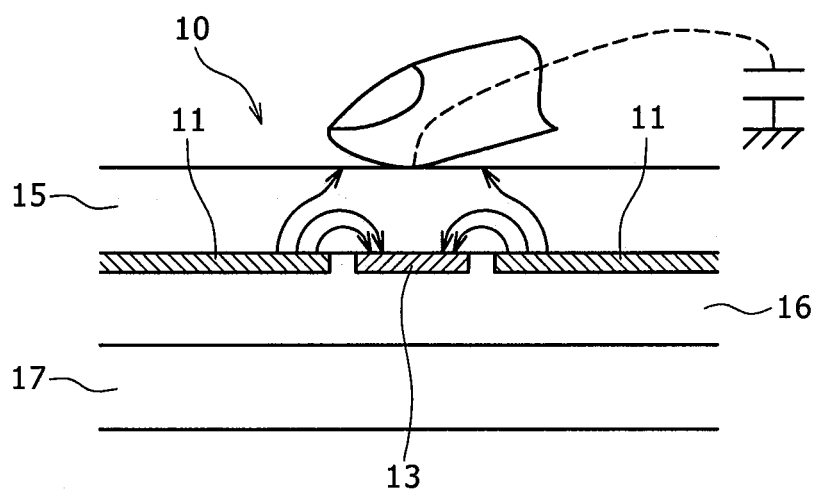

FIGS. 7A and 7B are explanatory diagrams showing a signal level detected by the signal detection circuit 34. FIG. 7A illustrates a state in which a finger of the human body as a pointer is not positioned in the proximity of a cross point between a transmission conductor 11 and a reception conductor 13 (i.e., a position at which they cross each other). Meanwhile, FIG. 7B illustrates a state in which a finger is positioned in the proximity of the cross point. When a finger is not positioned in the proximity of the cross point as shown in FIG. 7A, the transmission conductor 11 and the reception conductor 13 are capacitively coupled to each other at the cross point with the spacer 16 interposed therebetween, and an electric field emerging from the transmission conductor 11 converges toward the reception conductor 13. Accordingly, if a signal of a predetermined frequency (one of $f_0$ to $f_{15}$) is supplied to the transmission conductor 11, then current corresponding to the degree of the capacitive coupling can be extracted from the reception conductor 13 that is capacitively coupled to the transmission conductor 11. On the other hand, when a finger is positioned in the proximity of the cross point as illustrated in FIG. 7B, although it is the same as when a finger is not positioned in the proximity of the cross point to the extent that current can be extracted from the reception conductor 13, the degree of the capacitive coupling between the transmission conductor 11 and the reception conductor 13 is different. In particular, since part of an electric field emerging from the transmission conductor 11 now converges toward the finger, the degree of the capacitive coupling with the reception conductor 13 becomes weak, and the current to be extracted from the reception conductor 13 decreases.

In the present embodiment, since signals of the 16 different frequencies $f_0$, $f_1$, . . . , $f_{15}$ are supplied in parallel to 16 transmission conductors 11, which cross one reception conductor 13, data extracted from the reception conductor 13 includes the 16 different frequency components. The signal detection circuit 34 extracts the 16 different frequency components separately from each other (for example, carries out synchronous detection to extract them), and detects signal levels corresponding to the individual frequency components.

The signal levels detected by the signal detection circuit 34 are stored in association with the positions of the cross points. For example, combinations of $Y_0$ to $Y_{63}$ which specify the transmission conductors 11 and $X_0$ to $X_{127}$ which specify the reception conductors 13 are used as addresses indicative of the positions of the cross points, and the combinations of the addresses and the signal levels that correspond to the respective cross points are stored. It is to be noted that, when the 16 different frequency components included in a signal outputted from one reception conductor 13 are to be considered, since it is known to which transmission conductor 11 a signal is supplied in each of the blocks B0 to B15 of the transmission conductor group 12 at that point of time, it is possible to specify which transmission conductor 11 is a supply destination of a signal of each frequency.

At a timing when one full cycle of a switching operation by each of the switches 23-0 to 23-15 in the transmission conductor selection circuit 23 and a switching operation by each of the switches 31-0 to 31-15 in the reception conductor selection circuit 31 has been completed, that is, at a timing when a detection operation of the signal levels corresponding to all of the cross points where the transmission conductors 11 of the transmission conductor group 12 and the reception conductors 13 of the reception conductor group 14 of the sensor section 10 cross each other has been completed, the position calculation circuit 35 determines a cross point at which the signal level exhibits a drop as the position near which a finger (a pointer) is placed.

The position detection sensor 100 of the present embodiment has such a configuration as described above. Now, details of the transmission conductors 11 and the reception conductors 13 provided in the sensor section 10 are described.

Figure 8:
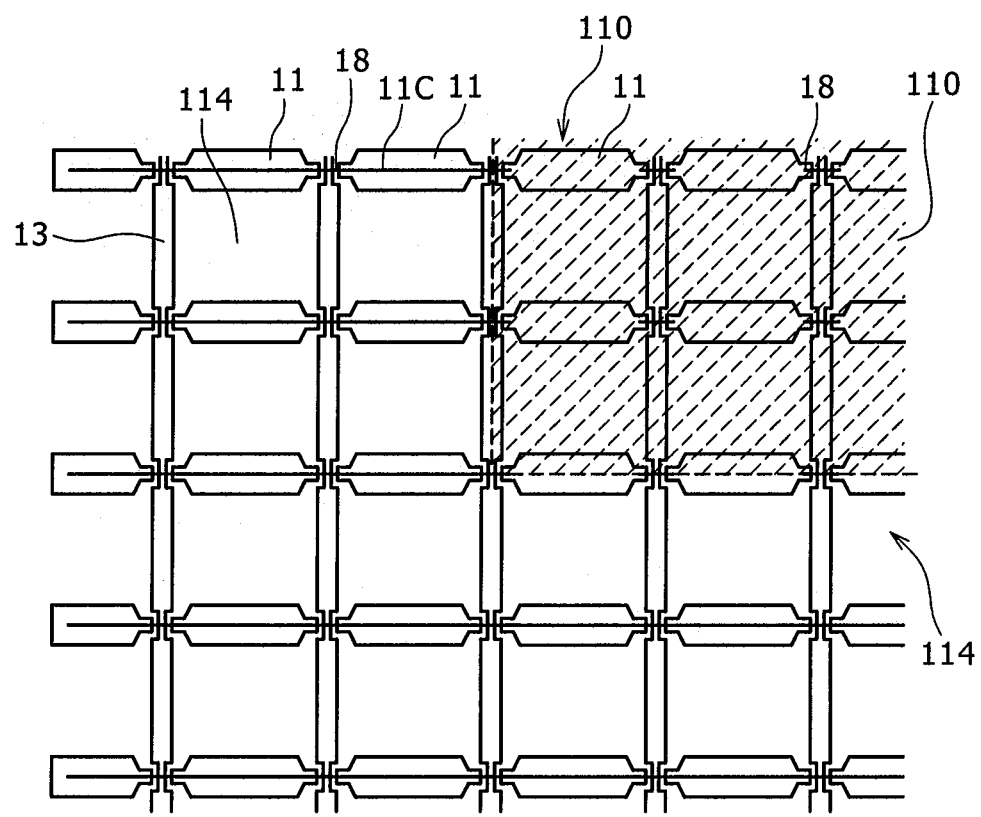
FIG. 8 is a partial plan view showing details of transmission conductors and reception conductors in the proximity of an outer periphery of a sensor section.

FIG. 8 is a partial plan view showing details of the transmission conductors 11 and the reception conductors 13 in the proximity of an outer periphery of the sensor section 10 and shows a configuration as viewed from the opposite (back) side of a face of the sensor section 10 that the pointer 300 contacts. As described with reference to FIG. 1, the detection region 112 is set to be wider by a predetermined width than the transparent region 110. This detection region 112 includes the transparent region 110, and a non-transparent region 114 of a predetermined width disposed around the transparent region 110. When the display apparatus 200 is disposed such that the display screen has a horizontally elongated shape and the display apparatus 200 is inclined so as to be nearly perpendicular to the ground face, a plurality of transmission conductors 11 disposed in parallel to each other have their longitudinal direction extend horizontally and a plurality of reception conductors 13 disposed in parallel to each other have their longitudinal direction extend vertically, and both the transmission conductors 11 and the reception conductors 13 are formed over both of the transparent region 110 and the non-transparent region 114.

Figure 9:
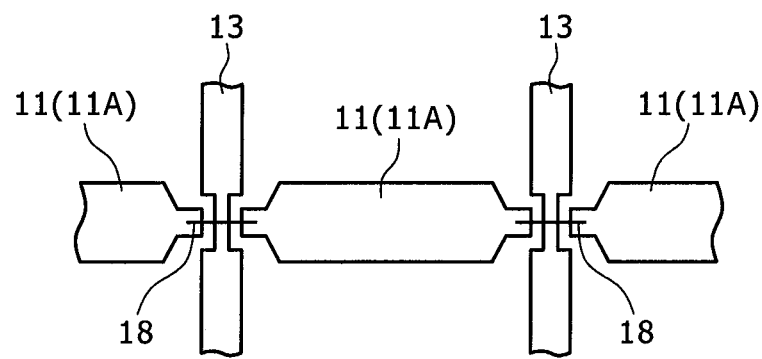
FIG. 9 is a partial enlarged view showing details of one transmission conductor in a transparent region and two reception conductors that cross the transmission conductor.

FIG. 9 is a partial enlarged view showing details of one transmission conductor 11 included in the transparent region 110 and two reception conductors 13 which cross the transmission conductor 11. As shown in FIG. 9, the transmission conductor 11 extending in the horizontal direction includes a plurality of conductor pieces 11A, which are separated from each other by gaps formed at positions where the transmission conductor 11 crosses the reception conductors 13. The transmission conductor 11 also includes a metal jumper line 18 for electrically connecting each pair of conductor pieces 11A, which are positioned adjacent to each other with each of the gaps interposed therebetween. While each reception conductor 13 extending in the vertical direction is reduced in width at a portion thereof corresponding to a gap of the transmission conductor 11 in comparison with the other portion thereof, it is formed as one integral conductor which continues along its entirety.

Figure 10:
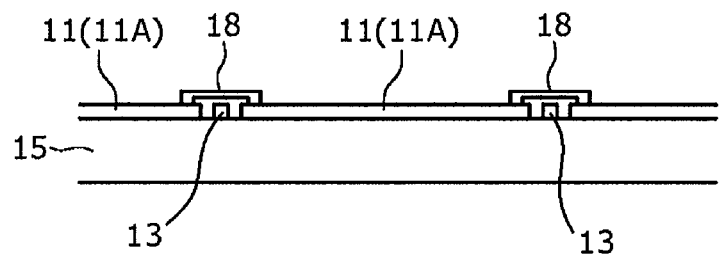
FIG. 10 is a sectional view taken along a longitudinal direction of a transmission conductor in a transparent region.

FIG. 10 is a sectional view taken along the longitudinal direction of a transmission conductor 11 in the transparent region 110 and shows the metal jumper lines 18 and a structure around each of the metal jumper lines 18. As shown in FIG. 10, each metal jumper line 18 connects end portions of two conductor pieces 11A positioned adjacent to each other with a gap interposed therebetween, and is spaced from a reception conductor 13 disposed in the gap such that its electric isolation from the reception conductor 13 is ensured.

Figure 11:
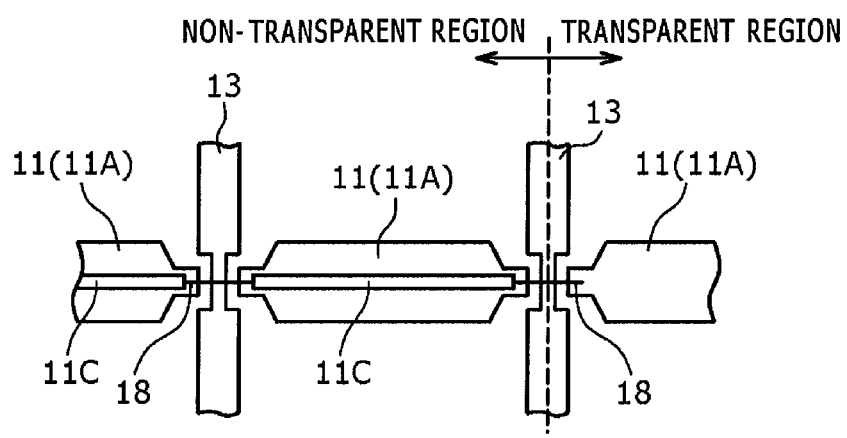
FIG. 11 is a partial enlarged view showing details of one transmission conductor included in a non-transparent region and twp reception conductors that cross the transmission conductor.

FIG. 11 is a partial enlarged view showing details of one transmission conductor 11 included in the non-transparent region 114 and two reception conductors 13 which cross the transmission conductor 11. As shown in FIG. 11, the transmission conductor 11 extending in the horizontal direction in the non-transparent region 114 includes a plurality of conductor pieces 11A, which are separated from each other by gaps formed at positions where the transmission conductor 11 crosses the reception conductors 13. The transmission conductor 11 also includes metal jumper lines 18, each electrically connecting a pair of conductor pieces 11A that are positioned adjacent to each other with a gap described hereinabove interposed therebetween. The transmission conductor 11 still further includes metal wiring line patterns 11C formed along the longitudinal direction on the surface of the conductor pieces 11A integrally with the metal jumper lines 18. In particular, as apparent by comparing the configuration shown in FIG. 11 with the configuration for the transparent region 110 shown in FIG. 9, the configuration of FIG. 11 is different in that it additionally includes the metal wiring line patterns 11C while it is the same in regard to the shape, disposition, and so forth of the transmission conductors 11 (or the conductor pieces 11A) and the reception conductors 13. The metal wiring line patterns 11C are formed by extending the metal jumper lines 18 formed on the boundary between the non-transparent region 114 and the transparent region 110 along the transmission conductors 11 into the non-transparent region 114, and so forth. In the present embodiment, the metal wiring line patterns 11C described above correspond to the second conductive members having a resistance value lower than the transmission conductors 11 or the reception conductors 13.

Figure 12:
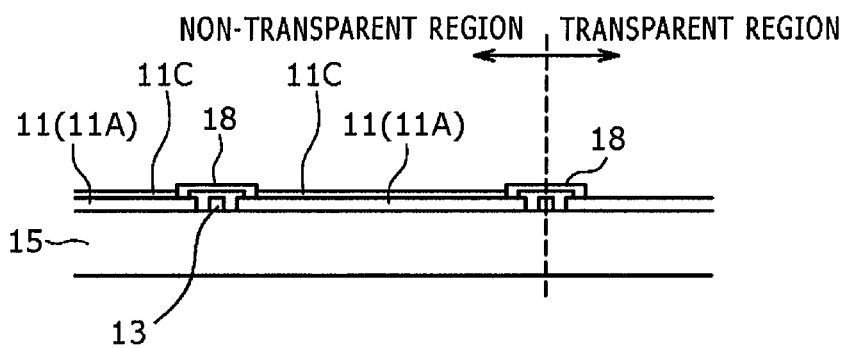
FIG. 12 is a sectional view taken along a longitudinal direction of a transmission conductor in a non-transparent region.

FIG. 12 is a sectional view taken along the longitudinal direction of a transmission conductor 11 in the non-transparent region 114 and shows the metal jumper lines 18, the metal wiring line patterns 11C, and a structure surrounding them. As shown in FIG. 12, each metal jumper line 18 connects end portions of two conductor pieces 11A positioned adjacent to each other with a gap interposed therebetween, and is spaced away from the reception conductor 13 disposed in the gap. Further, on the surface of the transmission conductor 11 included in the non-transparent region 114, a metal wiring line pattern 11C is formed with no insulating layer interposed therebetween and is electrically connected at an end portion thereof to the metal jumper line 18.

Accordingly, in the position detection sensor 100 of the present embodiment, since a metal wiring line pattern 11C is disposed in parallel to a transmission conductor 11 in the non-transparent region 114, the resistance corresponding to this portion of the transmission conductor 11 is reduced and the overall resistance of the entire transmission conductor 11 including this portion is also reduced. Consequently, the transmission characteristic of a signal through the transmission conductor 11 is improved.

Further, since both of the transparent region 110 and the non-transparent region 114 can be set as the position detection range (i.e., the detection region 112) for the pointer 300, it is possible to reliably detect a position pointed to by the pointer 300 even at the peripheral portion of the transparent region 110.

The metal wiring line patterns 11C provided in parallel to the transmission conductor 11 extend along the longitudinal direction of the transmission conductor 11, on which the metal wiring line patterns 11C are disposed. Consequently, the resistance along the longitudinal direction of the transmission conductor 11 can be reduced, and a transmission characteristic is improved as compared to when only the transparent transmission conductor 11 having a high resistance value is used.

As described above, the transmission conductors 11 and the reception conductors 13 are individually formed on the surface of the first glass substrate 15 such that at no region they overlap each other. Consequently, both of the transmission conductors 11 and the reception conductors 13 can be formed in a single layer. In particular, since both of the transmission conductors 11 and the reception conductors 13 can be formed from a single-layer ITO film formed on the first glass substrate 15, two different sets of conductors (transmission conductors 11 and reception conductors 13) having uniform and desirable characteristics can be formed simultaneously. Consequently, simplification of the manufacturing process becomes possible in addition to achieving further improvement to the transmission characteristic.

Since the metal wiring line patterns 11C disposed in an overlapping relationship on the transmission conductors 11 can be formed by extending the metal jumper lines 18, which connect the conductor pieces 11A to each other, it is not necessary to add a new step solely to add the metal wiring line patterns 11C and, accordingly, the manufacturing process can be further simplified.

Now, a particular example of a manufacturing process of the position detection sensor 100 is described. FIGS. 13A-13F are views illustrating the manufacturing process of the position detection sensor 100 according to one embodiment.

Figure 13A:
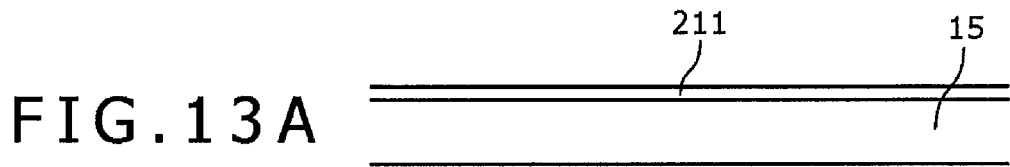
FIGS. 13A-13F are views illustrating steps of manufacturing a position detection sensor.

(1) An ITO film 211 is formed on a first glass substrate 115 as a transparent substrate to be disposed in an overlapping relationship with a display screen (the first step, FIG. 13A).

Figure 13B:
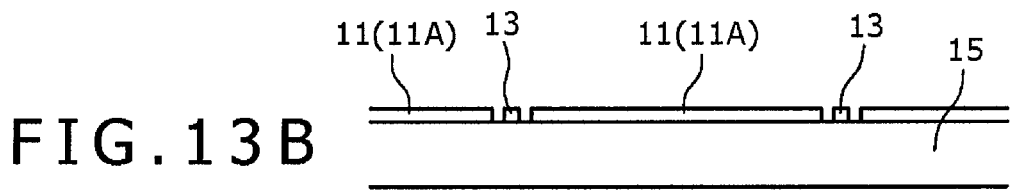

(2) Photolithography and etching are carried out to form reception conductors 13 and transmission conductors 11 from the ITO film 211 on the first glass substrate 115 (the second step, FIG. 13B). At this time, the reception conductors 13 are formed as continuous lines and the transmission conductors 11 are formed as broken lines which are cut at cross points with the reception conductors 13.

Figure 13C:
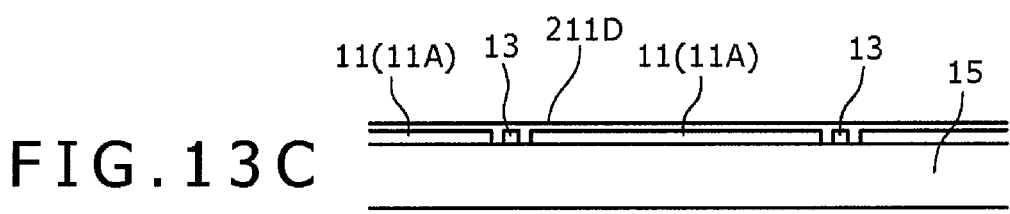

(3) A coater is used to form an insulating layer 211D over the transmission conductors 11 and the reception conductors 13, which are formed on the first glass substrate 115 (FIG. 13C).

Figure 13D:
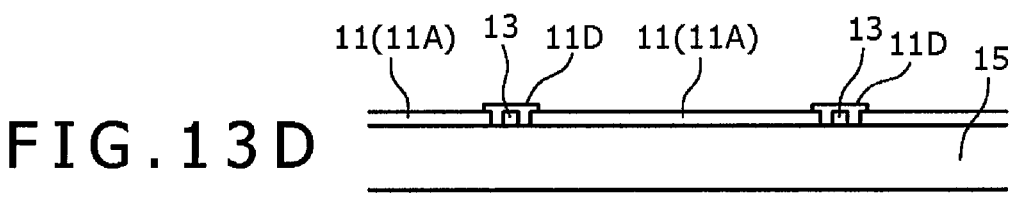

(4) Photolithography and etching are carried out to remove unnecessary portions of the insulating layer 211D to form an insulating layer 11D at each of the cross points of the transmission conductors 11 and the reception conductors 13 (the third step, FIG. 13D).

Figure 13E:
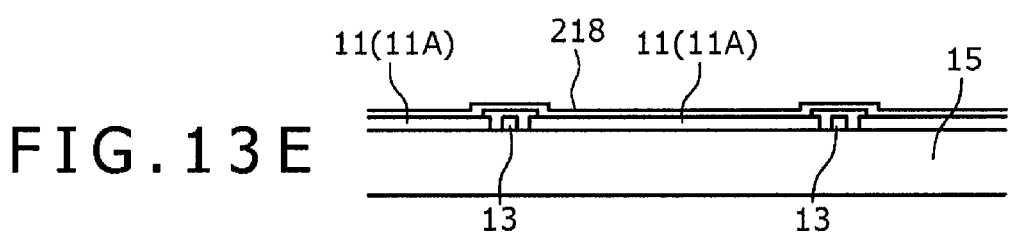

(5) Metal is sputtered from above the first glass substrate 115, on which the transmission conductors 11, reception conductors 13, and insulating layer 11D are formed, to thereby form a metal layer 218 (FIG. 13E).

Figure 13F:
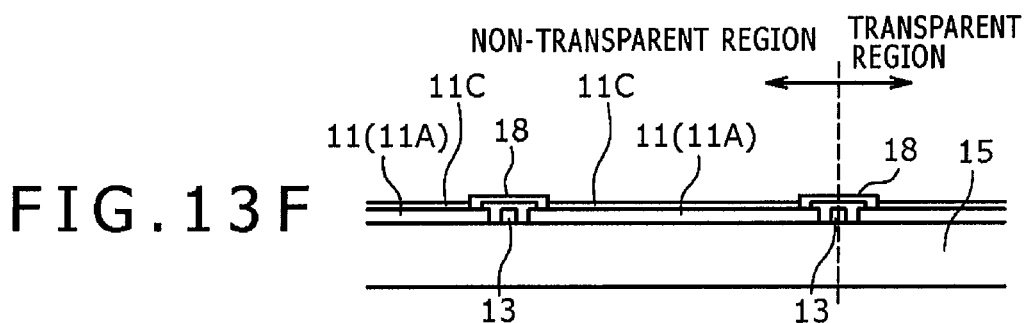

(6) Photolithography and etching are carried out to remove all portions of the metal layer 218 other than the portions, which are formed on the insulating layer 11D provided at the cross points between the transmission conductors 11 and the reception conductors 13 (the fourth step, FIG. 13F). The metal layer 218 formed over the insulating layer 11D forms the metal jumper lines 18, which stretch across (over) the reception conductors 13. Also, during the step of selectively removing the metal layer 218, when forming the metal jumper line 18 at the cross point in the screened region (i.e., in the non-transparent region 114) that is the closest to the valid area (i.e., the transparent region 110), the metal layer 218 that overlaps the ITO film (the transmission conductors 11) in the screened region is left to remain, without being removed. Similarly, the metal layer 218 is left to remain over other ITO film portions in the screened region. Thus, the metal layer 218 which overlaps the ITO film in the screened region forms the metal wiring line patterns 11C. Thereafter, an overcoat material is applied to complete the position detection sensor 100.

In the position detection sensor 100 manufactured in this manner, since the metal wiring line patterns 11C are disposed in parallel to the transmission conductors 11 in the non-transparent region 114, the resistance at this portion (i.e., the resistance of both the transmission conductors 11 and the metal wiring line patterns 11C) is reduced, and the overall resistance of the transmission conductors 11 including these portions (i.e., the overall transmission conductors 11 extending over both of the transparent region 110 and the non-transparent region 114) is reduced. Therefore, the signal transmission characteristic can be improved. Further, since the metal jumper lines 18 necessary for connecting the transmission conductors 11 (or the conductor pieces 11A) are extended to form the metal wiring line patterns 11C, which are disposed in an overlapping relationship on the transmission conductors 11, the manufacturing process is simplified.

It is to be noted that the present invention is not limited to the embodiments described above but can be carried out in various modified forms without departing from the subject matter of the present invention. For example, while, in the embodiment described above, the metal wiring line patterns 11C are added to the surface only of the transmission conductors 11 included in the non-transparent region 114, similar metal wiring line patterns may be added to the surface of the reception conductors 13 included in the non-transparent region 114. However, since the reception conductors 13 do not use a metal jumper line at a portion thereof, it is necessary to independently add metal wiring line patterns. However, formation of these metal wiring line patterns may be carried out simultaneously with formation of the metal wiring line patterns 11C for the transmission conductors 11. Further, the metal wiring line patterns 11C may be provided only on the surface of the reception conductors 13 included in the non-transparent region 114, without the metal wiring line patterns 11C being provided on the transmission conductors 11.

Further, while, in the embodiments described hereinabove, the metal jumper lines 18 and the metal wiring line patterns 11C are disposed continuously along the longitudinal direction of each transmission conductor 11 in the non-transparent region 114, it is possible to provide partial gaps to the metal wiring line patterns 11C such that segments thereof are separated from each other. Also, the metal wiring line patterns 11C need not be provided for all transmission conductors 11 included in the non-transparent region 114, and the metal wiring line patterns 11C may be provided for only some of the transmission conductors 11.

While, in FIG. 12, the entire metal wiring line patterns 11C are disposed in a closely contacting relationship with the surface of the conductor pieces 11A, they may be disposed such that they are at least partially spaced apart from the surface of the conductor pieces 11A.

While, in the embodiments described hereinabove, the width of the metal wiring line patterns 11C formed in an overlapping relationship with the transmission conductors 11 is made smaller than that of the transmission conductors 11, the width of the metal wiring line patterns 11C may be increased until it becomes equal to the width of the transmission conductors 11 at the maximum.

While, in the embodiments described hereinabove, the transmission conductors 11 and the reception conductors 13 cross each other perpendicularly, the present invention can be applied also in a case in which they cross each other at any angle other than 90 degrees.

While, in the embodiment described hereinabove, both of the transmission conductor group 12 and the reception conductor group 14 are grouped into 15 blocks, the number of blocks can be changed, and the block number of the transmission conductor group 12 and the block number of the reception conductor group 14 may be made different from each other. Further, a configuration is possible for detecting current from each of the reception conductors 13 included in the reception conductor group 14 while omitting the changeover (selective switching) operation over the reception conductors 13.

While, in the embodiments described hereinabove, a multiple frequency signal is used as a signal to be supplied to the transmission conductor 11 side, the supplied signal may be a signal other than a multiple frequency signal. For example, a similar effect can be achieved also with a position detection sensor wherein a plurality of spread code signals, particularly spread spectrum codes, are supplied to the transmission conductors 11 divided into blocks. A similar effect is achieved further with a position detection sensor wherein the phase of a particular spread code is shifted and supplied to each of the blocks, into which the transmission conductors 11 are divided.

While, in the embodiments described hereinabove, the present invention is applied to the position detection sensor 100 of the capacitance type wherein a signal is supplied to the transmission conductor 11 side while current outputted from the reception conductor 13 side is detected, the present invention can be applied also to a position detection sensor of the capacitance type wherein a capacitance value of each of two types of conductors (electrodes) which cross each other is detected to detect the position of a pointer as disclosed, for example, in Japanese Patent Laid-Open No. 2009-162538. Further, the present invention can be applied to a position detection sensor wherein conductors are selectively switched in order, even if it adopts a method other than the capacitance method.

INDUSTRIAL APPLICABILITY

According to the present invention, the resistance of a portion of each transmission conductor 11 as a transparent conductor, which overlaps the non-transparent region 114, is reduced due to the provision of a metal wiring line pattern 11C in parallel. Accordingly, the resistance of the entire conductor pattern of the transmission conductors 11 including these portions is reduced. Consequently, the transmission characteristic of the transmission conductors 11 is improved.

The invention claimed is:

1. A pointer detection apparatus including a position detection sensor disposed in an opposing relationship to a display region of a display apparatus, for detecting a position pointed to by a pointer based on a signal obtained by said position detection sensor, wherein:
   said position detection sensor includes a substrate having a first region corresponding to said display region and a second region exclusive of the first region and corresponding to a non-display region, a plurality of conductors disposed in a first direction on one face side of said substrate, and another plurality of conductors disposed in a second direction crossing the first direction, the plurality of conductors disposed in the first direction and second direction being made of first material;
   each of the plurality of conductors disposed in the first direction of said position detection sensor is formed from a plurality of conductor pieces separated from each other by gaps formed at positions where the plurality of conductors disposed in the first direction cross the plurality of conductors disposed in the second direction, and a plurality of first conductive members made of second material having a lower resistance value than that of the first material are provided on a first surface of the plurality of conductors disposed in the first direction, each of the first conductive members connecting a pair of said conductor pieces that are disposed adjacent to each other with one of the gaps interposed therebetween, without contacting the plurality of conductors disposed in the second direction, to achieve insulation of the plurality of conductors disposed in the first direction from the plurality of conductors disposed in the second direction; and
   only in the second region of the substrate corresponding to the non-display region, a second conductive member made of the same second material as that of said first conductive members is overlaid on the same first surface of the plurality of conductors disposed in the first direction on which said first conductive members are provided.

2. The pointer detection apparatus according to claim 1, wherein
   the plurality of conductors disposed in the first direction are transmission conductors to which a transmission signal is inputted.

3. The pointer detection apparatus according to claim 1, wherein
   said second conductive member disposed on said position detection sensor is formed integrally with the first conductive members.

4. The pointer detection apparatus according to claim 3, wherein
   the plurality of conductors disposed in the first direction are transmission conductors to which a transmission signal is inputted.

5. A position detection sensor disposed in an opposing relationship to a display region of a display apparatus, for detecting a position pointed to by a pointer, said position detection sensor comprising:
   a substrate having a first region thereof configured to oppose and overlap the display region of the display apparatus and a second region thereof exclusive of the first region and corresponding to a non-display region; and
   a plurality of conductors disposed in a first direction on one face side of said substrate and another plurality of conductors disposed in a second direction crossing the first direction, wherein
   each of the plurality of conductors disposed in the first direction is formed from a plurality of conductor pieces separated from each other by gaps formed at positions where the plurality of conductors disposed in the first direction cross the plurality of conductors disposed in the second direction, and a plurality of first conductive members made of second material having a lower resistance value than that of the first material are provided on a first surface of the plurality of conductors disposed in the first direction, each of the first conductive members connecting a pair of said conductor pieces that are disposed adjacent to each other with one of the gaps interposed therebetween, without contacting the plurality of conductors disposed in the second direction, to achieve insulation of the plurality of conductors disposed in the first direction from the plurality of conductors disposed in the second direction, and
   only in the second region of said substrate corresponding to the non-display region, a second conductive member made of the same second material as that of said first conductive members is overlaid on the same first surface of the plurality of conductors disposed in the first direction on which said first conductive members are provided.

6. The position detection sensor according to claim 5, wherein
   the plurality of conductors disposed in the first direction are transmission conductors to which a transmission signal is inputted.

7. The position detection sensor according to claim 5, wherein
   said second conductive member is formed integrally with the first conductive members.

8. The position detection sensor according to claim 5, wherein
   the plurality of conductors disposed in the first direction are reception conductors from which a position detection signal is extracted.

9. A method for manufacturing a position detection sensor for use with a pointer detection apparatus, the position detection sensor being configured to be disposed in an opposing relationship to a display apparatus including a display region for displaying information and to detect a position pointed to by a pointer, the method comprising:
   disposing a conductor film having a transparent property on one face side of a substrate having a first region thereof configured to oppose and overlap the display region of the display apparatus and a second region thereof exclusive of the first region and corresponding to a non-display region;

forming a plurality of conductors disposed in a first direction and another plurality of conductors disposed in a second direction crossing the first direction from the conductor film and forming, at each of positions where the plurality of conductors disposed in the first direction cross the plurality of conductors disposed in the second direction, one of the conductors disposed in one of the directions into a plurality of conductor pieces electrically separated from one of the conductors disposed in the other direction, the plurality of conductors disposed in the first direction and second direction being made of first material;

disposing an insulator at the positions where the plurality of conductors disposed in the first direction cross the plurality of conductors disposed in the second direction;

disposing, at each of the positions where the plurality of conductors disposed in the first direction cross the plurality of conductors disposed in the second direction, a first conductive member made of second material having a lower resistance value than that of the first material on a first surface of the conductor pieces to connect each pair of conductor pieces in an overlapping relationship with the insulator; and only in the second region of said substrate corresponding to the non-display region, overlaying a second conductive member made of the same second material as that of the first conductive members on the same first surface of the conductor pieces on which said first conductive members are disposed.

10. The pointer detection apparatus according to claim 1, wherein the first material is Indium Tin Oxide (ITO) film and the second material is metal.

11. The pointer detection apparatus according to claim 10, wherein the second material is aluminum or molybdenum.

12. The pointer detection apparatus according to claim 1, wherein the first conductive member is formed as an extension of the first conductive members formed of the same second material.

13. The position detection sensor according to claim 5, wherein the first material is Indium Tin Oxide (ITO) film and the second material is metal.

14. The position detection sensor according to claim 13, wherein the second material is aluminum or molybdenum.

15. The position detection sensor according to claim 5, wherein the first conductive member is formed as an extension of the first conductive members formed of the same second material.

16. The method according to claim 9, wherein the first material is Indium Tin Oxide (ITO) film and the second material is metal.

17. The method according to claim 16, wherein the second material is aluminum or molybdenum.

18. The method according to claim 9, wherein the first conductive member is formed as an extension of the first conductive members formed of the same second material.

19. The method according to claim 9, wherein the step of disposing the first conductive members and the step of overlaying the second conductive member are performed in a single step.

20. The pointer detection apparatus according to claim 1, wherein the first region is transparent and the second region is non-transparent.

* * * * *